United States Patent [19]

Pisani

[11] Patent Number: 4,990,260
[45] Date of Patent: Feb. 5, 1991

[54] METHOD AND APPARATUS FOR REMOVING OXIDIZABLE CONTAMINANTS IN WATER TO ACHIEVE HIGH PURITY WATER FOR INDUSTRIAL USE

[75] Inventor: Joseph Pisani, Sierra Madre, Calif.
[73] Assignee: The Water Group, Inc., El Segundo, Calif.
[21] Appl. No.: 149,384
[22] Filed: Jan. 28, 1988
[51] Int. Cl.$^5$ ............................................... C02F 1/46
[52] U.S. Cl. .................................... 210/664; 210/668; 210/669; 210/748; 210/758; 210/765; 210/900
[58] Field of Search ...................... 210/121, 194, 195.3, 210/206, 221.1, 262, 263, 264, 266, 748, 754, 756, 760, 765, 682, 900, 188, 192, 259; 250/437, 438; 241/1; 138/45; 422/24

[56] References Cited
U.S. PATENT DOCUMENTS

| | | | |
|---|---|---|---|
| 4,273,660 | 6/1981 | Beitzel | 210/760 |
| 4,280,912 | 7/1981 | Berry, III et al. | 210/266 |
| 4,296,066 | 10/1981 | Schenck | 250/437 |
| 4,296,328 | 10/1981 | Regan | 250/432 R |
| 4,428,757 | 1/1984 | Hall | 210/188 |
| 4,544,499 | 10/1985 | Tran et al. | 210/682 |
| 4,698,153 | 10/1987 | Matsuzaki et al. | 210/266 |
| 4,764,278 | 8/1988 | Chou et al. | 210/748 |
| 4,808,287 | 2/1989 | Hark | 210/259 |
| 4,842,723 | 6/1989 | Parks et al. | 210/192 |

FOREIGN PATENT DOCUMENTS

| 2097686 | 5/1987 | Japan | 210/900 |
|---|---|---|---|
| 2097687 | 5/1987 | Japan | 210/900 |

*Primary Examiner*—Frank Spear
*Assistant Examiner*—Joseph Drodge
*Attorney, Agent, or Firm*—Thomas I. Rozsa

[57] ABSTRACT

A method and apparatus for removing contaminants in waters used for industrial cleaning. The method and apparatus begins with water which has been purified to level of approximately 18 megaohms resistivity with total inorganic dissolved solids to 1 part per trillion and total organic dissolved carbon contaminants in the range of approximately 100 parts per billion, and purifies it to a level of approximately 18 megaohms resistivity with total inorganic dissolved solids to 1 part per trillion and total organic dissolved carbon contaminants in the range of approximately 10 parts per billion. The method and apparatus includes means for inducing cavitation in the water and irradiating the water with ultraviolet radiation to thereby cause the oxidizable contaminants to be oxidized and therefore removed before the water is used for industrial cleaning.

7 Claims, 1 Drawing Sheet

METHOD AND APPARATUS FOR REMOVING OXIDIZABLE CONTAMINANTS IN WATER TO ACHIEVE HIGH PURITY WATER FOR INDUSTRIAL USE

BACKGROUND OF THE INVENTION

1. Field of the Invention

The present invention relates to a method and apparatus for removing oxidizable contaminants in water to achieve high purity water for industrial use. The present invention is used in conjunction with conventional purification systems which remove certain inorganic and non-oxidizable contaminants. Some of the impurities can be removed through conventional filters. However, many organic impurities and other inorganic solids are not removed by conventional filtering means. The present invention provides a system whereby the impurities, and in particular organic carbon and other organic impurities are significantly reduced in electronic quality water.

2. Description of the Prior Art

One key element of the present invention purification process involves the concept of reducing the oxygen demand in the water stream. Since the contaminants which are not removed by conventional filtering systems are usually oxidizable materials, the oxidation of such materials serves to degrade and eliminate them. This concept is described in general terms in the paper "Innovative Oxidation Technology for Waste Pretreatment", by Stanley A. Peterson and Nicholas S. Zaleiko, which was published in the Feb. 1981 issue of Water/Engineering & Management ("Oxidation Article"). The method described in the Oxidation Article is an improvement over a previously known "wet oxidation process" which is used to treat municipal and industrial aqueous effluents containing oxidizable organic compounds. The wet oxidation process comprises forcing compressed air through the heated effluents (heated to temperatures of 150 degrees centigrade to 320 degrees centigrade) under pressure (300 to 3000 psig) in the presence of cupric ion as an oxidation catalyst. Under conditions of the process, organic compounds present in the effluent are degraded by sequential oxidation to carbon dioxide, water and refractory organic compounds such as formic and acetic acids. Additional treatments are required to remove the refractory organic compounds. As discussed in the Oxidation Article, the process described therein includes subjecting the liquid to be purified to cavitation, adding a free radical initiator, inducing supplementary cavitation and exposing the liquid to ultraviolet (UV) light. When cavitation is applied, the bubble explosion in cavitation ruptures the thin cell membrane of organic sludges. In addition to oxidation by the free radical, the exposure to ultraviolet light provided for additional free radical oxidation.

The process discussed in the Oxidation Article was further described in a patent application filed by Nicholas Zaleiko entitled Method And Apparatus For Oxidative Degradation Of Water Contaminants. That application was subsequently abandoned.

The above referenced application and the Oxidation Article concentrated on removing impurities from waste waters and specifically concerned the following:

(1) Oxidation of process chemicals such as dyes, fatty acids, sludges and certain organics;

(2) Sanitary and industrial wastewater treatment at remote locations;

(3) Specific industrial wastes such as cyanides, sulfites, phenols, fat renderings, food processing pigments, pharmaceutical, soft drink and alcohol-type wastes;

(4) Pulp and paper bleaching and processing;

(5) Semicatalytic oxidation of refractory compounds such as those from plating and photographic wastes;

(6) Treatment of various in-plant side streams such as digester supernatant and thickener overflows;

(7) Destruction and treatment of septic wastes.

This prior art process concentrated on the above applications and did not expand the treatment process to other applications such as purifying water prior to its use in industrial applications such as cleaning semiconductor wafers. In addition, inventor Zaleiko included several complicated steps such as heating the liquid. The present invention greatly simplifies the process and utilizes it in new and non-obvious applications.

The inventor is also aware of the following prior art patents which relate to various purification and treatment processes:

1. U.S. Pat. No. 2,722,498 issued to Morrell et al. in 1955 for "Process For Separating Organic Material From Inorganic Material".

2. U.S. Pat. No. 3,288,295 issued to Kelly in 1966 for "Tank Cover Structures".

3. U.S. Pat. No. 3,401,115 issued to Meyer et al. in 1968 for "Sewage Treatment System".

4. U.S. Pat. No. 3,480,543 issued to Hildebrand in 1969 for "Process And Apparatus For Disinfection Of Sewage".

5. U.S. Pat. No. 3,672,823 issued to Boucher in 1972 for "Method Of Sterilizing Liquids".

6. U.S. Pat. No. 3,677,409 issued to Ferm et al. in 1972 for "Sewage Treatment System".

7. U.S. Pat. No. 4,013,552 issued to Kreuter in 1977 for "Sewage Treatment Process".

8. U.S. Pat. No. 4,076,617 issued to Bybel et al. in 1978 for "Sonic Cavitation And Ozonation Of Waste Material".

9. U.S. Pat. No. 4,144,152 issued to Kitchens in 1979 for "Dehalogenation Of Halogenated Compounds".

The processes described in the above patents differ from the Oxidation Article and the abandoned Zaleiko patent application, and also differ from the specific application to purifying waters before they are used in industrial applications, etc.

The inventor is also aware of the following patents which disclose various apparatus and/or methods by which cavitation and other shock treatments are employed in a cleaning process:

1. U.S. Pat. No. 2,660,564 issued to Davis in 1953 for "Method Of Reducing The Density of Aerogels And Similar Materials".

2. U.S. Pat. No. 2,832,545 issued to Segraves for "Supersonic Jet Grinding Means And Method".

3. U.S. Pat. No. 2,911,787 issued to Barry in 1959 for "Inlet Probe".

4. U.S. Pat. No. 3,265,090 issued to Elliott in 1966 for "Fluid Flow Controller".

5. U.S. Pat. No. 3,278,165 issued to Gaffney in 1966 for "Method And Apparatus For Generating Acoustic Vibrations In Flowing Fluids".

6. U.S. Pat. No. 3,504,945 issued to Leibundgut et al. in 1970 for "Pneumatic Conveyer System".

7. U.S. Pat. No. 3,538,803 issued to Joseph in 1970 for "Cavitation Machining Apparatus".

8. U.S. Pat. No. 3,674,216 issued to Blair in 1972 for "Treating Liquid Waste Effluent".

9. U.S. Pat. No. 4,053,110 issued to Schalkowsky et al. in 1977 for "Shock Press".

10. U.S. Pat. No. 4,284,245 issued to Fishgal in 1981 for "Machine Lubrication System".

11. U.S. Pat. No. 4,506,834 issued to Ek in 1985 for "Method And Device For Dispersing Material".

While there are many prior art references dealing with the inducement of cavitation and other shock effects utilized in purification processes to treat wastes, none of the references disclose the concept of the present invention treatment process employed prior to utilization of the water in industrial cleaning or consumption.

Much work has been done on microbial control and treatment systems employing chemicals to destroy the microorganism present in recirculating water. These systems, commonly used in large water re-circulation systems, are chemical treatment processes involving oxidation of the organic material. They have a high cost and maintenance as well as presenting some hazard to the operators.

A need has developed for a compact and reliable treatment system employing free-radical chemical reaction capabilities of auto-oxidation of both organic and inorganic materials present in water enhanced by the addition of catalysts so that the reactions can be induced to rapid completion by high energy transfer. Prior art of aerobic or chemical treatment systems have not satisfied the need.

There exists a significant need to clean the recirculating water system of cleansing waters used for various industrial applications such as the cleaning of silicon wafers, so as to assure that certain oxidizable contaminants are removed from the water before it is used in the cleaning operation.

SUMMARY

The present invention includes a modular self contained unit for microbial control and contaminant removal of industrial cleaning waters and other recirculating water exposed to air. The present invention combines the energy of cavitation synergistically with ultraviolet radiation to induce free radical oxidation of the contaminants.

The present invention relates to an apparatus and method for oxidizing and degrading microorganisms, organic and inorganic contaminants in waters used for industrial purposes such as cleaning and washing silicon wafers. The waters are purified prior to use as opposed to the process in the Oxidation Article and Zaleiko Patent Application where the water and accompanying sewage was purified after use and before being discarded. The water containing contaminants is subjected to degradation, in a semi-closed loop in which cavitation causes sonic implosions. The oxidation and degradation is enhanced by the reaction of the contaminants with free radicals created both by the sonic implosions caused by cavitation and the ultraviolet stimulation in the presence of dissolved oxygen.

This invention relates to a method for microbial and contaminant control or disinfection of liquids or liquid streams by combining the effect of ultraviolet energy with cavitation under carefully defined contact time and energy levels. The use of commercially available ultraviolet radiations, having wavelengths of between 2000 A and 3100 A have been used for water purification. Commercially available ultraviolet sterilization of liquids is restricted by the radiant energy and the clarity of the processed fluid.

Strong bactericial effects are believed to be produced by the high energy photon release in the region of 2000 A to 3100 A due to the correlation with the absorption, in this region, of DNA and nucleic acid. To obtain a strong bactericidal effect, one must release a certain number of quanta which is absorbed by the microorganism and which in turn penetrates the micro-organism and be of sufficient magnitude to initiate and maintain a given photochemical reaction.

Quanta with sufficient energy which can be released through a liquid depends on the degree of transmission of the ultraviolet energy through the liquid. It also depends to a great extent upon the turbulence level in the liquid. K. Dohnalik (Gaz. Voda Tech. Sanit. 39, 14–16, 1965) says, in the case of water, the ultraviolet transmission is an inverse function of its mineral and organic content. Iron salts have a greater effect on the ultraviolet absorption than other salts and alkali salts seem to have little effect. Ultraviolet transmission in water, t, varies exponentially with liquid depth, d, and the absorption coefficient, a, according to:

$$t = e^{-ad}$$

Consequently, efficient coupling of the ultraviolet energy through water at the distances normally used in industrial sterilizing systems require low absorption coefficient.

By coupling ultraviolet radiation with cavitation induced free radical oxidation, a method for providing an optimum kill rate is presented in this invention.

"Cavitation" is a phenomenon in which the formation and collapse of small bubbles takes place through the entire liquid. It may be produced in a number of ways. The method selected in this invention is the use of a cavitation "critical flow" nozzle. The bubbles created by the cavitation nozzle are formed when the hydrodynamic pressure of the liquid is lower than the vapor pressure of the liquid causing vapor bubble to form and then collapse as the pressures equilibrate, imparting a very large amplitude shock wave (up to several hundred atmospheres) with local temperatures up to many hundred degrees centigrade.

Both water molecules and the water borne microorganisms (pathogens, viruses, fungi, algae and spores) exposed to cavitation shock waves of the type described above, should be considered here. It is known that the chemical bonds of molecules are broken by these conditions, leading to free radicals capable of inducing oxidation of these micro-organisms through the formation of bactericidal compounds such as peroxides, hydroxyl radicals, oxygen and hydrogen atoms initiating several types of free radical chemical reactions. As described in the Zaleiko Article, cavitation induces ionization within the collapsing bubbles. The hydroxyl radical is formed at the inner surfaces of the vacuum bubbles and the surrounding liquid. Organics and oxidizable material present are diffused into the bubbles and the oxidation initiates during the collapse. The oxidation is chain-reaction in nature in the presence of dissolved oxygen. In addition to the oxidation effects produced, cavitation has been shown to be a significant destructive force in the breakdown of a biomass present in septic wastes and organic sludges which contains many organisms possessing a thin shell membrane. The membrane is cellular in nature and is made up primarily of protein material; when cavitation is applied, the outer protective shell along with the cell wall ruptures. The result is cell disruption and initial oxidation of the suspended solids in the liquid.

Therefore, it has been discovered, according to the present invention, that the efficiency of cleaning industrial products with water can be substantially enhanced by purifying the recirculating stream of water which is used in industrial cleaning coils and removing oxidizable contaminants therefrom, to thereby reduce and/or eliminate the contact of contaminated water with the industrial products.

It has also been discovered, according to the present invention, that the most efficient way to purify the water is to pass the water through a conventional filter operation to remove large contaminants and thereafter run the water through the present invention process involving inducing cavitation in the water, and thereafter subjecting the water to ultraviolet radiation, and then allow the purified water to be used for the industrial cleaning operation.

It is therefore an object of the present invention to provide a method and apparatus for oxidizing certain oxidizable contaminants in the recirculating water stream used for industrial cleaning, consumption, etc. to thereby remove these contaminants from the water stream and thereby provide for a cleaner operating environment.

It is a further object of the present invention to reduce the total organic carbon (TOC) of electronic quality water which has an estimated resistivity of 18 megaohms, in the range of less than 100 parts per billion (ppb) of TOC to less than 10 ppb of TOC through the use of cavitation combined with oxidizing media in the presence of ultraviolet radiation to induce hydroxyl free radical oxidation of the TOC present.

It is a further object of the present invention to create oxidating chemicals required due to stimulation by cavitation and by ultraviolet radiation (in the range of 254 nanometers or 185 nanometers) to induce free radical oxidation, causing the reduction of TOC by oxidation. The energies involved in the cavitation process initiate the free radical formation causing the auto oxidation reaction to begin. The reaction is then further stimulated by ultraviolet radiation to allow the reaction to go to completion.

Further novel features and other objects of the present invention will become apparent from the following detailed description, discussion and the appended claims, taken in conjunction with the drawings.

DRAWING SUMMARY

Referring particularly to the drawings for the purpose of illustration only and not limitation, there is illustrated:

DETAILED DESCRIPTION OF THE PREFERRED EMBODIMENT

Although specific embodiments of the invention will now be described with reference to the drawings, it should be understood that such embodiment is by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
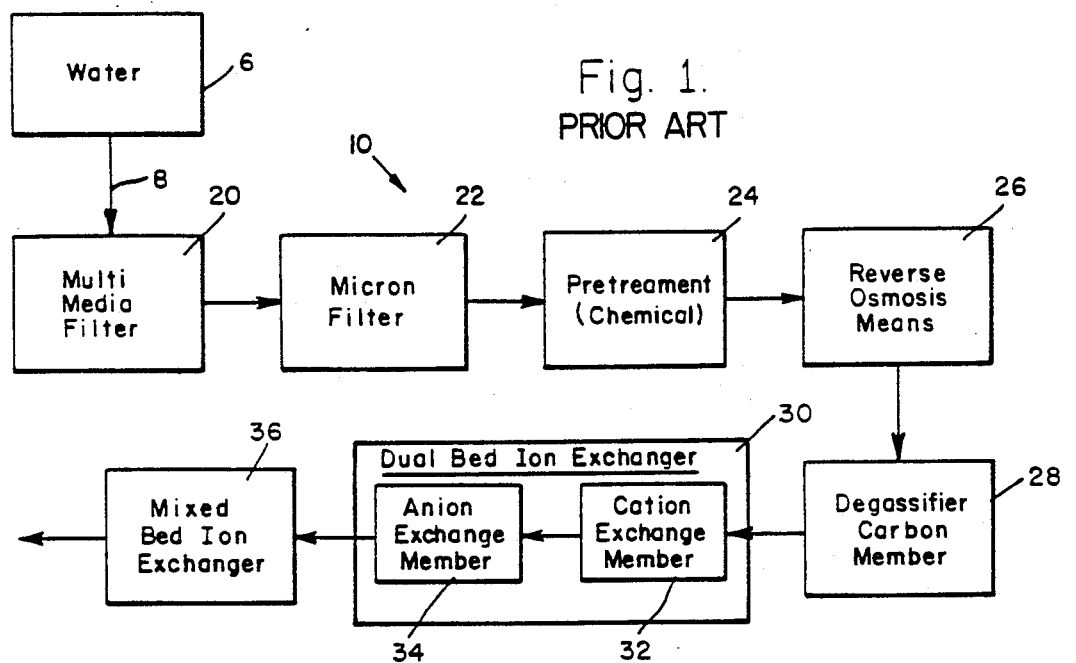
FIG. 1 is a flow diagram of a pre-treatment filter to remove most of the inorganic solids and reduce the organic contamination in the water before it is processed by the present invention.

Referring to FIG. 1, there is shown at 10 a standard system known in the prior art which is used to remove certain non-oxidizable contaminants from standard water such as city water in order to bring the water to a purification level comparable to 18 megaohm water. The standard pre-filtering apparatus 10 may comprise: (i) a multi media filter 20 which comprises filtering elements such as carbon and sand to filter out particles; (ii) a micron filter 22 such as a 5 micron filter which may be a cartridge filter used to remove fine particles from the water stream; (iii) a pre-treatment chemical feed system 24 such as sulfuric acid to acidify the water and prevent calcium/magnesium scaling in the reverse osmosis membrane; (iv) a reverse osmosis process means 26 which serves to reduce the total dissolved solids in the water; (v) an optional degassification means 28 which degasses the water to remove dissolved carbon dioxide or ammonia from the reverse osmosis process; (vi) a Dual Bed Ion-exchange means 30 which comprises a cation exchange member 32 and an anion exchange member 34 to further remove dissolved solids from the water; and (vii) a Mixed Bed Ion-exchange means 36 which is a combination of cation (40%) and anion (60%) means to further remove dissolved inorganic solids. Therefore, through use of this conventional apparatus, the water 6 passes through water line 8 and is caused to flow through multi media filter 20, micron filter 22, pre-treatment chemical feed system 24, reverse osmosis means 26, degassification means 28 and the dual ben ion-exchanger 30 to bring the water 6 to a purification level wherein the electronic quality of the water 6 has an estimated resistivity of approximately 18 megaohms with total organic carbon contaminants in the range of approximately 100 parts per billion and total inorganic dissolved solids of approximately 8 parts per million. The water 6 is then passed through the Mixed Bed Ion-exchange 36 to reduce the total inorganic dissolved solids to 1 part per trillion. Thereafter, after passing through the standard prior art process, the water 6 is purified to a resistivity of 18 megaohms with total inorganic dissolved solids to 1 part per trillion (and therefore essentially removed) and total organic carbon contaminants in the range of approximately 100 parts per billion.

Figure 2:
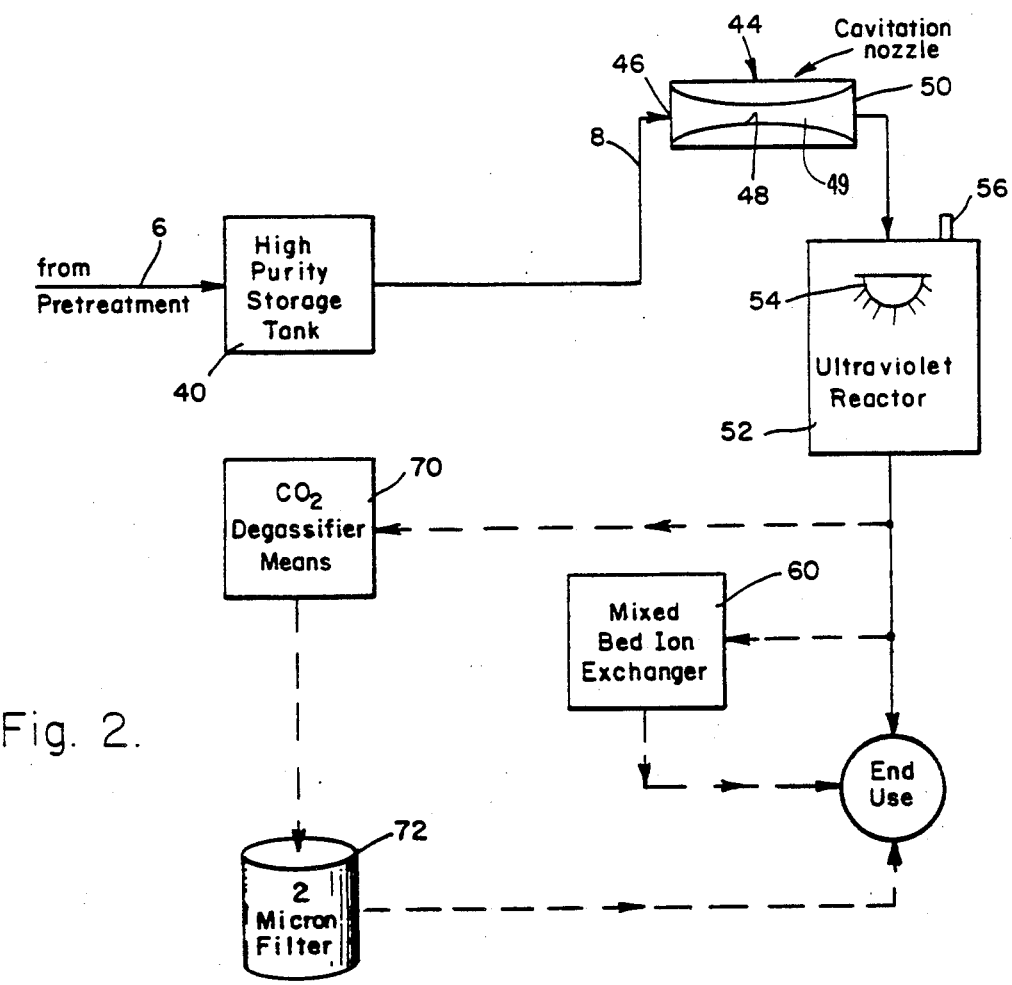
FIG. 2 is a flow diagram of the present invention method and apparatus for purifying liquids before use in industrial cleaning applications.

From the Mixed Bed Ion Exchanger 36, the water 6 is directed to the present invention high purity water treatment apparatus and method shown in FIG. 2. The purified water 6 may be fed into a high purity storage tank 40. From the storage tank 40, (if used) the water 6 is fed into a conventional cavitation nozzle 44. The water 6 enters cavitation nozzle 44 through inlet 46 and passes through throat 48. Upon exiting throat 48 at location 49 in chamber 50, the cavitation is induced into the water 6. Cavitation causes the water to disassociate and consequently form the hydroxyl free radical. The hydroxyl free radical is the oxidizing agent. The water 6 in which cavitation has been induced is then allowed to flow along the water line 8 into an ultraviolet (U.V.) reactor chamber or reactor 52 which houses an ultraviolet lamp 54. In the preferred embodiment, the retention time in the ultraviolet reaction chamber 52 is approximately two (2) minutes or less. In the preferred embodiment, the ultraviolet lamp 54 is either 254 nanometers or 185 nanometers. During the course of the reactions which occur in the ultraviolet reactor, gases may evolve. Therefore, a vent valve 56 is placed in the reactor to allow gases to be vented. The treated water 6 is discharged from the ultraviolet reactor 52 to be used in the intended application such as industrial cleansing. By way of example, the 185 nanometer ultraviolet lamp will ionize the water and form a small amount of ozone and further will excite the water molecule to form a hydroxyl radical which serves to dissolve the organic contaminants. The hydroxyl radical formed during the irradiation with ultraviolet light is the oxidizing agent which serves to oxidize the contaminants. The result is a reduction of the contaminants and conversion to carbon dioxide. The water may then be fed through degassification means such as the vent valve 56 to remove the carbon dioxide and also possibly ammonia or sulfuric acid vapors which may have been formed. After going through the present invention treatment process and apparatus, the water 6 is now purified to a level of having a resistivity of 18 megaohms, with total inorganic dissolved solids to 1 part per trillion (and therefore essentially removed) and total organic carbon contaminants in the range of approximately 10 parts per billion. One type of industrial cleansing is to clean silicon wafer chips. The water 6 may be stored in the high purity storage tank 40 or may be recycled through the present invention process and apparatus, depending on the contamination level of the particular source of water. Through this self sustaining and auto-oxidation reaction induced by both cavitation and ultraviolet radiation, complete oxidation of the organic contaminants is achieved through the progressive recycling of contaminated water. The number of recycles of the water 6 is a function of the contaminant level of organics and micro-organisms in the water.

As an additional optional step, the water 6 may be further recycled through a second Mixed Bed Ion Exchanger 60 in order to further remove contaminants. This second mixed bed ion exchanger 60 is also composed of a 40% cation member and a 60 anion member. From the Mixed Bed Ion Exchanger 60, the water 6 is passed to its final use.

As an alternative additional optional step, the water 6 may be passed from the ultraviolet reactor 52 to a Carbon Dioxide degassification means 70 and from there to a 0.2 Micron Filter to remove fine contaminants before being passed to its final use.

The present invention includes both the method and apparatus for performing the above described purification process. The present invention involves a method for removing oxidizable contaminants in recycled water 6 prior to use of the water 6, wherein the water 6 has been pre-treated to achieve a purity level of approximately 18 megaohms resistivity with total inorganic dissolved solids to 1 part per trillion and total organic dissolved carbon contaminants in the range of approximately 100 parts per billion, comprising: (a) inducing cavitation in the oxygenated water 6 by causing the water 6 to flow through a cavitation nozzle 44; and (b) irradiating the cavitated oxygenated water 6 with ultraviolet radiation by causing the cavitated oxygenated water 6 to flow into an ultraviolet reactor 52 and be subjected to irradiation through an ultraviolet lamp 54; whereby the combination of cavitation and ultraviolet radiation serve to oxidize and thereby remove the oxidizable contaminants contained in the water 6 so that the water 6 is purified to a level of approximately 18 megaohms resistivity with total inorganic dissolved solids to 1 part per trillion and total organic dissolved carbon contaminants in the range of approximately 10 parts per billion. The present invention further comprises repeating steps a and b until the desired purity level is achieved. In the preferred embodiment, the water 6 may be irradiated with ultraviolet radiation for less than two minutes. The ultraviolet lamp 54 may be either 254 or 185 nanometers. The method of the present invention may further comprise the step of venting carbon dioxide gases from the water while it is being irradiated with ultraviolet radiation. The method of the present invention may comprise the further step of treating the water 6 with a mixed bed cation-anion ion exchange means 60 to further purify the water. The method of the present invention may comprise the further steps of (a) degassifying the water to remove excess carbon dioxide; and (b) filtering the water to remove particles up to 0.2 microns.

The present invention also involves an apparatus for removing oxidizable contaminants in recycled water prior to use of the water, wherein the water has been pre-treated to achieve a purity level of approximately 18 megaohms resistivity with total inorganic dissolved solids to 1 part per trillion and total organic dissolved carbon contaminants in the range of approximately 100 parts per billion, comprising: (a) means for inducing cavitation in the oxygenated water 6 by causing the water to flow through a cavitation nozzle 44; and (b) means for irradiating the cavitated water 6 with ultraviolet radiation by causing the cavitated water 6 to flow into an ultraviolet reactor 52 and be subjected to irradiation through an ultraviolet lamp 54; whereby the combination of cavitation and ultraviolet radiation serve to oxidize and thereby remove the oxidizable contaminants contained in the water 6 so that the water 6 is purified to a level of approximately 18 megaohms resistivity with total inorganic dissolved solids to 1 part per trillion and total organic dissolved carbon contaminants in the range of approximately 10 parts per billion. In the preferred embodiment, the means for inducing cavitation in the water is a cavitation nozzle 44 containing an inlet 46, a critical throat area 48 through which the water 6 passes, and an opening 50 after the critical throat area 48 in which the cavitation is induced in the water 6. The means for irradiating the cavitated water 6 with ultraviolet radiation is an ultraviolet reactor 52 into which the water 6 is fed and an ultraviolet lamp 54 housed within the ultraviolet reactor 52 and directed toward the water 6 contained within the ultraviolet reactor 52. In the preferred embodiment, the ultraviolet lamp is either 254 nanometers or 185 nanometers. The present invention further comprises means 56 for venting carbon dioxide gases from the water 6 while it is being irradiated with ultraviolet radiation. In an optional step, the present invention further comprises a mixed bed cation-anion ion exchange means 60 to further purify the water. As a further optional step, the present invention may further comprise (a) means 70 for degassifying the water to remove excess carbon dioxide; and (b) means 72 for filtering the water to remove particles up to 0.2 microns.

Of course, the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms of modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A method for removing oxidizable contaminants in recycled water prior to use of the water, wherein the water has been pre-treated to achieve a purity level of approximately 18 megaohms resistivity with dissolved total inorganic solids of 1 part per trillion and dissolved total organic carbon contaminants in the range of approximately 100 parts per billion, comprising:
   a. inducing cavitation in the water by causing the water to flow through a cavitation critical flow nozzle wherein the hydrodynamic pressure of the water is lower than the vapor pressure of the water causing vapor bubbles to form and then collapse as the pressures equilibrate, imparting a large amplitude shock wave of several hundred atmospheres with local temperatures of many hundred degrees centigrade to thereby create hydroxyl free radicals in the water to act as an oxidizing agent; and
   b. irradiating the cavitated water containing the hydroxyl free radicals with ultraviolet radiation by causing the cavitated water to flow into an ultraviolet reactor and be irradiated by an ultraviolet lamp;
   c. whereby the cavitation process which creates the hydroxyl free radicals oxidizes the oxidizable organic contaminants in the water and the irradiation with ultraviolet radiation continues the oxidation process initiated by the hydroxyl free radicals to fully oxidize the oxidizable organic contaminants and thereby decompose the oxidizable organic contaminants contained in the water so that the water is purified to a level of dissolved total organic carbon contaminants in the range of approximately 10 parts per billion.

2. The method in accordance with claim 1 further comprising repeating steps a and b until a purity level of dissolved total organic carbon contaminants of 10 parts per billion is achieved.

3. The method in accordance with claim 1 wherein said ultraviolet lamp has a wavelength of 254 nanometers.

4. The method in accordance with claim 1 wherein said ultraviolet lamp has a wavelength of 185 nanometers.

5. The method in accordance with claim 1 further comprising venting carbon dioxide gases from the water while it is being irradiated with ultraviolet radiation.

6. The method in accordance with claim 1 comprising treating the water with a mixed bed cation-anion exchange means to further purify the water after steps a and b have been performed.

7. The method in accordance with claim 1 comprising the further steps of:
   a. degassifying the water to remove excess carbon dioxide; and
   b. filtering the water to remove particles of 0.2 micron and greater diameter.

* * * * *